United States Patent
Goel et al.

(10) Patent No.: US 12,230,146 B2
(45) Date of Patent: Feb. 18, 2025

(54) EFFICIENT VTOL RESOURCE MANAGEMENT IN AN AVIATION TRANSPORT NETWORK

(71) Applicant: Joby Aero, Inc., Santa Cruz, CA (US)

(72) Inventors: Nikhil Goel, San Francisco, CA (US); Jon Petersen, Walnut Creek, CA (US); John Badalamenti, San Francisco, CA (US); Mark Moore, San Francisco, CA (US)

(73) Assignee: JOBY AERO, INC., Santa Cruz, CA (US)

(*) Notice: Subject to any disclaimer, the term of this patent is extended or adjusted under 35 U.S.C. 154(b) by 474 days.

(21) Appl. No.: 17/514,823

(22) Filed: Oct. 29, 2021

(65) Prior Publication Data
US 2022/0122467 A1     Apr. 21, 2022

Related U.S. Application Data

(63) Continuation of application No. 17/461,212, filed on Aug. 30, 2021, which is a continuation of application
(Continued)

(51) Int. Cl.
*G08G 5/00* (2006.01)
*B64C 29/02* (2006.01)
(Continued)

(52) U.S. Cl.
CPC .............. *G08G 5/003* (2013.01); *B64C 29/02* (2013.01); *G06Q 50/40* (2024.01); *G06Q 50/47* (2024.01);
(Continued)

(58) Field of Classification Search
CPC .. G06Q 50/30; G06Q 10/06315; G06Q 10/02; G05D 1/0088; G01C 23/00;
(Continued)

(56) References Cited

U.S. PATENT DOCUMENTS 3,035,789 A     5/1962  Young
4,022,405 A     5/1977  Peterson
(Continued)

FOREIGN PATENT DOCUMENTS

CN      105427003 A  *  3/2016
CN      11063221        1/2020
(Continued)

OTHER PUBLICATIONS

T. S. L. Prashanth, et al. "Multimodal transport model: Enhancing collaboration among mobility sharing schemes by identifying an optimal transit station," 2016 Itnl Conf on Internet of Things and Applications (IOTA), Pune, India, 2016, pp. 286-291 ieeexplore.ieee.org/document/7562739?source=IQplus (Year: 2016).*
(Continued)

*Primary Examiner* — Jerry O'Connor
*Assistant Examiner* — Michael R Koester
(74) *Attorney, Agent, or Firm* — Dority & Manning, P.A.

(57) ABSTRACT

A transport network management system identifies a service objective for a plurality of VTOL aircraft and retrieves VTOL data including locations of the plurality of VTOL aircraft. An estimate of demand for transport services to be provided at least in part by one of the VTOL aircraft is generated and routing data for the plurality of VTOL aircraft is determined based on the estimated demand and the service objective. Routing instructions based on the routing data are sent to at least a subset of the VTOL aircraft.

20 Claims, 6 Drawing Sheets

Related U.S. Application Data

No. 15/961,806, filed on Apr. 24, 2018, now Pat. No. 11,145,211.

(60) Provisional application No. 62/489,992, filed on Apr. 25, 2017.

(51) Int. Cl.
    *G06Q 30/0202* (2023.01)
    *G06Q 50/40* (2024.01)
    *G06Q 50/47* (2024.01)

(52) U.S. Cl.
    CPC ......... *G08G 5/0034* (2013.01); *G08G 5/0039* (2013.01); *G08G 5/0043* (2013.01); *G06Q 30/0202* (2013.01)

(58) Field of Classification Search
    CPC .... G01C 21/20; G08G 5/0013; G08G 5/0039; G08G 5/0043; B64D 27/24
    See application file for complete search history.

(56) References Cited

U.S. PATENT DOCUMENTS

| | | |
|---|---|---|
| 5,823,468 A | 10/1998 | Bothe |
| 5,839,691 A | 11/1998 | Lariviere |
| 5,842,667 A | 12/1998 | Jones |
| 6,343,127 B1 | 1/2002 | Billoud |
| 6,892,980 B2 | 5/2005 | Kawai |
| 8,016,226 B1 | 9/2011 | Wood |
| 8,020,804 B2 | 9/2011 | Yoeli |
| 8,311,686 B2 | 11/2012 | Herkes et al. |
| 8,733,690 B2 | 5/2014 | Bevirt et al. |
| 8,737,634 B2 | 5/2014 | Brown et al. |
| 8,849,479 B2 | 9/2014 | Walter |
| 9,205,930 B2 | 12/2015 | Yanagawa |
| 9,301,099 B2 | 3/2016 | Witmer |
| 9,387,928 B1 | 7/2016 | Gentry et al. |
| 9,415,870 B1 | 8/2016 | Beckman et al. |
| 9,422,055 B1 | 8/2016 | Beckman et al. |
| 9,435,661 B2 | 9/2016 | Brenner et al. |
| 9,442,496 B1 | 9/2016 | Beckman et al. |
| 9,550,561 B1 | 1/2017 | Beckman et al. |
| 9,550,577 B1 | 1/2017 | Beckman |
| 9,663,237 B2 | 5/2017 | Senkel et al. |
| 9,694,911 B2 | 7/2017 | Bevirt et al. |
| 9,771,157 B2 | 9/2017 | Gagne et al. |
| 9,786,961 B2 | 10/2017 | Dyer et al. |
| 9,802,702 B1 | 10/2017 | Beckman et al. |
| 9,816,529 B2 | 11/2017 | Grissom et al. |
| 9,838,436 B2 | 12/2017 | Michaels |
| 10,140,873 B2 | 11/2018 | Adler et al. |
| 10,152,894 B2 | 12/2018 | Adler et al. |
| 10,216,190 B2 | 2/2019 | Bostick et al. |
| 10,249,200 B1 | 4/2019 | Grenier et al. |
| 10,304,344 B2 | 5/2019 | Moravek et al. |
| 10,330,482 B2 | 6/2019 | Chen et al. |
| 10,384,692 B2 | 8/2019 | Beckman |
| 10,593,215 B2 | 3/2020 | Villa |
| 10,593,217 B2 | 3/2020 | Shannon |
| 10,627,524 B2 | 4/2020 | Bennett |
| 10,663,529 B1 | 5/2020 | Bolotski |
| 10,713,957 B2 | 7/2020 | Goel |
| 10,752,365 B2 | 8/2020 | Galzin |
| 10,759,537 B2 | 9/2020 | Moore et al. |
| 10,768,201 B2 | 9/2020 | Luo et al. |
| 10,832,581 B2 | 11/2020 | Westervelt et al. |
| 10,836,470 B2 | 11/2020 | Liu et al. |
| 10,913,528 B1 | 2/2021 | Moore et al. |
| 10,948,910 B2 | 3/2021 | Taveira et al. |
| 10,960,785 B2 | 3/2021 | Villanueva et al. |
| 11,130,566 B2 | 9/2021 | Mikic et al. |
| 11,145,211 B2 | 10/2021 | Goel et al. |
| 11,238,745 B2 | 2/2022 | Villa et al. |
| 11,295,622 B2 | 4/2022 | Goel et al. |
| 2010/0079342 A1 | 4/2010 | Smith et al. |
| 2013/0144831 A1 | 6/2013 | Atlas |
| 2014/0179535 A1 | 6/2014 | Stückl et al. |
| 2015/0120094 A1 | 4/2015 | Kimchi et al. |
| 2015/0279217 A1 | 10/2015 | Chen et al. |
| 2015/0336668 A1 | 11/2015 | Pasko |
| 2016/0216711 A1 | 7/2016 | Srivastava |
| 2016/0244158 A1 | 8/2016 | Fredericks et al. |
| 2016/0311529 A1 | 10/2016 | Brotherton-Ratcliffe |
| 2016/0371984 A1* | 12/2016 | Macfarlane .......... G06V 20/176 |
| 2017/0021941 A1 | 1/2017 | Fisher et al. |
| 2017/0057650 A1 | 3/2017 | Walter-Robinson |
| 2017/0090484 A1 | 3/2017 | Obaidi |
| 2017/0097240 A1 | 4/2017 | Murrish |
| 2017/0129603 A1* | 5/2017 | Raptopoulos ............. B64F 1/22 |
| 2017/0169366 A1 | 6/2017 | Klein |
| 2017/0197710 A1* | 7/2017 | Ma ....................... G08G 5/0013 |
| 2017/0357914 A1 | 12/2017 | Tulabandhula |
| 2018/0018887 A1 | 1/2018 | Sharma et al. |
| 2018/0053425 A1 | 2/2018 | Adler et al. |
| 2018/0081360 A1 | 3/2018 | Bostick |
| 2018/0194469 A1* | 7/2018 | Evans ................... B64C 39/024 |
| 2018/0208305 A1 | 7/2018 | Lloyd |
| 2018/0216988 A1 | 8/2018 | Nance |
| 2018/0305005 A1 | 10/2018 | Parks |
| 2018/0354636 A1 | 12/2018 | Darnell et al. |
| 2019/0012909 A1 | 1/2019 | Mintz |
| 2019/0146508 A1 | 5/2019 | Dean et al. |
| 2019/0221127 A1 | 7/2019 | Shannon |
| 2019/0316849 A1 | 10/2019 | Abrego et al. |
| 2019/0325755 A1 | 10/2019 | Goel |
| 2019/0325757 A1 | 10/2019 | Goel |
| 2020/0103922 A1 | 4/2020 | Nonami et al. |
| 2020/0182637 A1 | 6/2020 | Kumar et al. |
| 2020/0388166 A1 | 12/2020 | Rostamzadeh et al. |
| 2021/0140777 A1 | 5/2021 | Balva |

FOREIGN PATENT DOCUMENTS

| | | | |
|---|---|---|---|
| EP | 0945841 A1 | | 9/1999 |
| EP | 2698749 A1 | | 2/2014 |
| EP | 3499634 A1 | | 6/2019 |
| JP | 2010095246 | | 4/2010 |
| JP | 2013086795 A | | 5/2013 |
| JP | 2020518070 | | 6/2020 |
| KR | 20170080354 A | * | 12/2015 |
| WO | WO2016093905 | | 6/2016 |
| WO | WO 2018023556 A1 | | 2/2018 |
| WO | WO2018198038 | | 11/2018 |
| WO | WO 2019089677 A1 | | 5/2019 |
| WO | WO2019207377 | | 10/2019 |
| WO | WO 2020252024 A1 | | 12/2020 |

OTHER PUBLICATIONS

Translation of CN-105427003-A (Year: 2016).*
International Search Report and Written Opinion for PCT/US2019/052578, mailed Aug. 1, 2019, 8 pages.
International Preliminary Report on Patentability for PCT/US2019/052578, mailed Jan. 5, 2020, 7 pages.
Extended European Search Report for 18790347.1, mailed on Jan. 8, 2020, 8 pages.
International Search Report and Written Opinion for PCT/IB201/052864, mailed Aug. 7, 2018, 11 pages.
International Preliminary Report on Patentability for PCT/IB201/052864, mailed Jan. 7, 2019, 8 pages.
Melton J. et al., "Combined Electric Aircraft and Airspace Management Design for Metro-Regional Public Transportation", Feb. 19-27, 2014, NASA Aeronautics Research Mission Directorate (ARMD), 2014 Seedling Technical Seminar, 63 pages.
Miao, F. et al., "Data-Driven Robust Taxi Dispatch under Demand Uncertainties," Mar. 20, 2016, 17 pages.
Miao, F. et al., "Taxi Dispatch with Real-Time Sensing Data in Metropolitan Areas: a Receding Horizon Control Approach," IEEE Transactions on Automation Science and Engineering, vol. 13, No. 2, Apr. 2016, pp. 463-478.

(56) References Cited

OTHER PUBLICATIONS

Uber Technologies, Inc. "Fast-Forwarding to a Future of On-Demand Urban Air Transportation," Oct. 27, 2016, 99 pages.
"Unmanned aerial vehicle—Wikipedia", Apr. 19, 2017, XP055833730, Retrieved from the Internet: URL:https://en.wikipedia.org/w/index.php?title=Unmanned-aerial-ehicle&oldid=776106328#Sensors [retrieved on Aug. 20, 2021], 28 pages.
Bennaceur et al., "Passenger-centric urban air mobility: Fairness trade-offs and operational efficiency", Transportation Research: Emerging Technologies, 2021, 29 pages.
Jong, "Optimizing cost effectiveness and flexibility of air taxis: a case study for optimization of air taxi operations", University of Twente, Master's thesis, 2007, 62 pages.

* cited by examiner

EFFICIENT VTOL RESOURCE MANAGEMENT IN AN AVIATION TRANSPORT NETWORK

CROSS REFERENCE TO RELATED APPLICATIONS

This application claims the benefit of U.S. Provisional Application No. 62/489,992, filed Apr. 25, 2017, U.S. Non-Provisional application Ser. No. 15/961,806, filed Apr. 24, 2018 (and issued as U.S. Pat. No. 11,145,211), and U.S. Non-Provisional application Ser. No. 17/461,212, filed Aug. 30, 2021, all of which are incorporated by reference in their entirety.

BACKGROUND

1. Technical Field

The subject matter described generally relates to aviation transport networks, and in particular to managing a network including ad hoc flights between hubs.

2. Background Information

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

DETAILED DESCRIPTION

Figure 1:
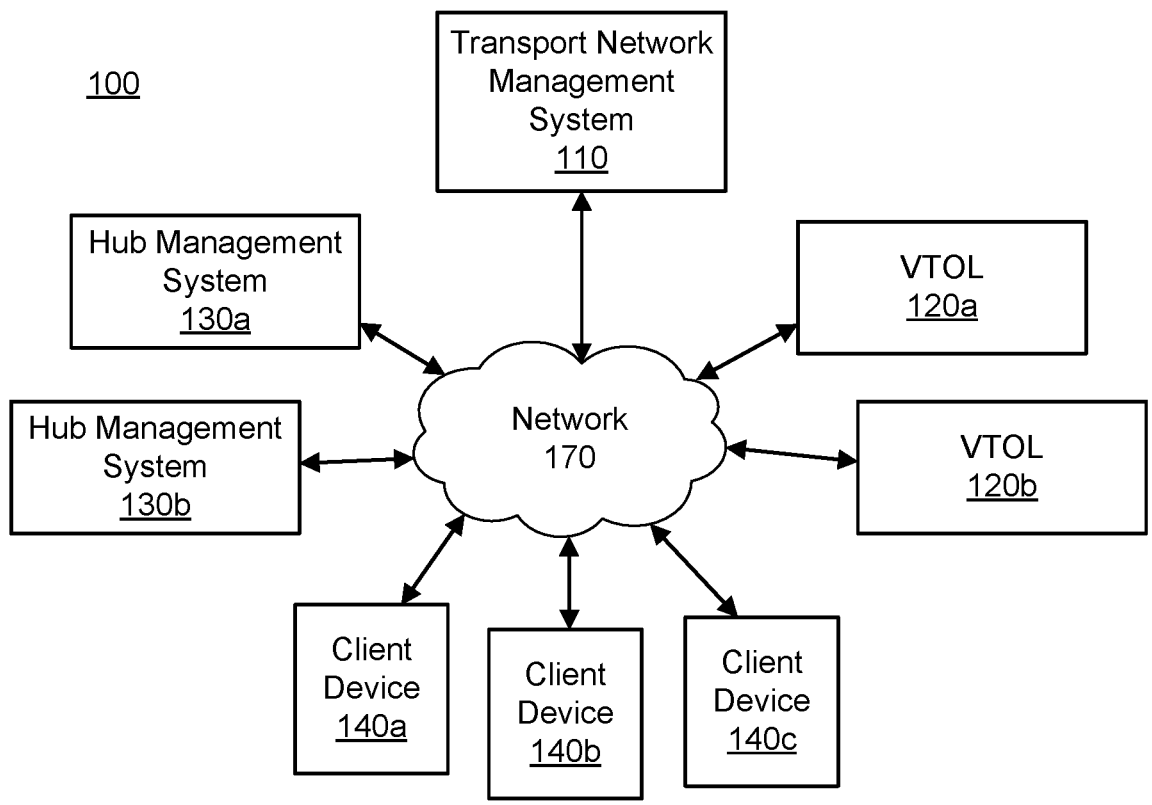
FIG. 1 is a high-level block diagram illustrating a computing environment associated with a transport network, according to one embodiment.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview

Air travel within cities has been limited compared to ground travel. Air travel can have a number of requirements making intra-city air travel difficult. For instance, aircraft can require significant resources such as fuel and infrastructure (e.g., runways), produce significant noise, and require significant time for boarding and alighting, each presenting technical challenges for achieving larger volume of air travel within cities or between neighboring cities. However, providing such air travel may reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL aircraft technically and commercially viable. Electric VTOL aircraft may be quieter than aircraft using other power sources, which further increases their viability for use in built-up areas where noise may be a concern.

In a planning phase, estimates of demand are used to identify candidate locations for hubs within a geographic region at which VTOL aircraft take-off and land. The demand estimates may also be used to narrow down the candidate locations to a selected subset of locations that best meets some predetermined objective (e.g., maximizing VTOL coverage, maximizing reductions in travel time, etc.). Flow of VTOL aircraft and people through the transport can then be simulated to gain insight into the proposed aviation transport network and further refine its configuration to better meet specified objectives.

Once a set of hubs have been built and a fleet of VTOL aircraft are in operation, demand prediction and network optimization processes may be used to coordinate provision of transport services. By optimizing the use of the VTOL aircraft fleet, the total power usage and wear and tear may be reduced while still saving riders significant amounts of time relative to ground-based transportation.

In one embodiment, a transport network management system 110 identifies a service objective for a plurality of VTOL aircraft and retrieves VTOL data including locations of the plurality of VTOL aircraft. An estimate of demand for transport services to be provided at least in part by one of the VTOL aircraft is generated and routing data for the plurality of VTOL aircraft is determined based on the estimated demand and the service objective. Routing instructions based on the routing data are sent to at least a subset of the VTOL aircraft.

Example System Environment

FIG. 1 illustrates one embodiment of a computing environment 100 associated with an aviation transport network. In the embodiment shown in FIG. 1, the computing environment 100 includes a transport network management system 110, a set of VTOL aircraft 120a, 120b, a set of hub management systems 130a, 130b, and a set of client devices

140a, 140b, 140c, all connected via a network 170. Where multiple instances of a type of entity are depicted and distinguished by a letter after the corresponding reference numeral, such entities shall be referred to herein by the reference numeral alone unless a distinction between two different entities of the same type is being drawn. In other embodiments, the computing environment 100 contains different and/or additional elements. In addition, the functions may be distributed among the elements in a different manner than described. For example, the hub management systems 130 may be omitted with information about the hubs stored and updated at the transport network management system 110.

The transport network management system 110 assists in the planning and design of the transport network. In one embodiment, the transport network management system 110 estimates demand for transport services, suggests locations for VTOL hubs to help meet that demand, and simulates the flow of riders and VTOL aircraft between the hubs to assist in network planning. Embodiments of the transport network management system 110 are described in greater detail below, with reference to FIGS. 2 through 6.

The transport network management system 110 may also coordinate transport services once a set of VTOL hubs are operational. The transport network management system 110 may pair users who request transport services (riders) with specific VTOL aircraft 120. The transport network management system 110 may also interact with ground-based transportation to coordinate travel services. For example, the transport network management system 110 may be an extension of an existing transport services coordinator, such as a ridesharing service.

In one embodiment, the transport network management system 110 treats a journey involving a VTOL aircraft 120 as having three legs: (1) from the rider's initial location to a first hub; (2) from the first hub to a second hub in a VTOL; and (3) from the second hub to the rider's destination. The first and third legs may be walking or provided by ground transportation, such as a ride-sharing service. The transport network management system 110 provides routing information to VTOL aircraft 120, such as what time to leave a current hub, which hub to fly to after departure, way points along the way, how long to spend charging before departure or on arrival, and the identity of individuals to carry. The transport network management system 110 may also direct certain VTOL aircraft 120 to fly between hubs without riders to improve fleet distribution (referred to as "deadheading").

The VTOL aircraft 120 are vehicles that fly between hubs in the transport network. A VTOL aircraft 120 may be controlled by a human pilot (inside the vehicle or on the ground) or it may be autonomous. In one embodiment, the VTOL aircraft 120 are battery-powered aircraft that use a set of propellers for horizontal and vertical thrust. The configuration of the propellers enables the VTOL aircraft to take-off and land vertically (or substantially vertically). For convenience, the various components of the computing environment 100 will be described with reference to this embodiment. However, other types of aircraft may be used, such as helicopters, planes that take-off at angles other than vertical, and the like. The term VTOL should be construed to include such vehicles.

A VTOL aircraft 120 may include a computer system that communicates status information (e.g., via the network 170) to other elements of the computing environment 100. The status information may include current location, current battery charge, potential component failures, and the like. The computer system of the VTOL aircraft 120 may also receive information, such as routing information and weather information. Although two VTOL aircraft 120 are shown in FIG. 1, a transport network can include any number of VTOL aircraft.

A hub management systems 130 provides functionality at a hub in the transport network. A hub is a location at which VTOL aircraft 120 are intended to land (and take-off). Within a transport network, there may be different types of hub. For example, a hub in a central location with a large amount of rider throughput might include sufficient infrastructure for sixteen (or more) VTOL aircraft 120 to simultaneously (or almost simultaneously) take off or land. Similarly, such a hub might include multiple charging stations for recharging battery-powered VTOL aircraft 120. In contrast, a hub located in a sparely populated suburb might include infrastructure for a single VTOL aircraft 120 and have no charging station. The hub management system 130 may be located at the hub or remotely and be connected via the network 170. In the latter case, a single hub management system 130 may serve multiple hubs.

In one embodiment, a hub management system 130 monitors the status of equipment at the hub and reports to the transport network management system 110. For example, if there is a fault in a charging station, the hub management system 130 may automatically report that it is unavailable for charging VTOL aircraft 120 and request maintenance or a replacement. The hub management system 130 may also control equipment at the hub. For example, in one embodiment, a hub includes one or more launch pads that may move from a takeoff/landing position to embarking/disembarking position. The hub management system 130 may control the movement of the launch pad (e.g., in response to instructions received from transport network management system 110 and/or a VTOL aircraft 120).

The client devices 140 are computing devices with which users may arrange transport services within the transport network. Although three client devices 140 are shown in FIG. 1, in practice, there may be many more (e.g., thousands or millions of) client devices connected to the network 170. In one embodiment, the client devices 140 are mobile devices (e.g., smartphones, tablets, etc.) running an application for arranging transport services. A user provides a pickup location and destination within the application and the client device 140 sends a request for transport services to the transport network management system 110. Alternatively, the user may provide a destination and the pickup location is determined based on the user's current location (e.g., as determined from GPS data for the client device 140).

Regardless of how they are generated, the transport network management system 115 may determine how to service transport requests. In one embodiment, a transport request can be serviced by a combination of ground-based and aerial transportation. The transport network management system 110 sends information about how the request will be serviced to the user's client device 140 (e.g., what vehicle the user should get into, directions on where to walk, if necessary, etc.).

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Transport Network Planning

Figure 2:
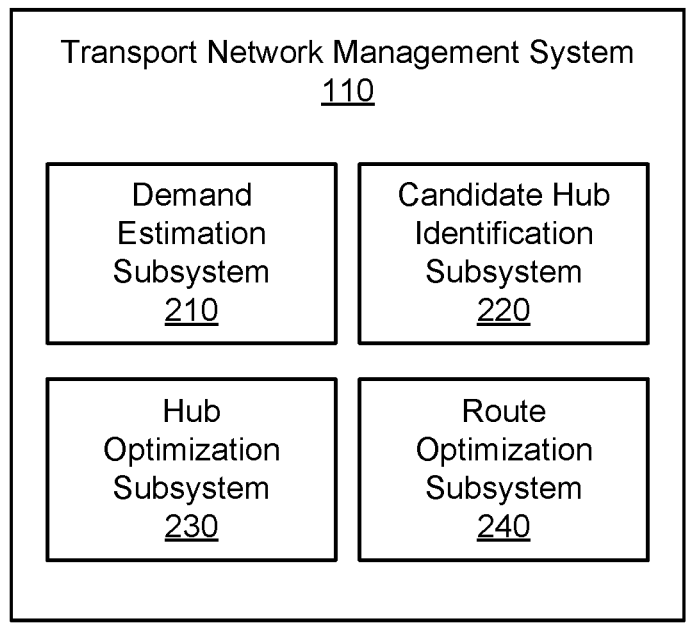
FIG. 2 is a high-level block diagram illustrating the transport network management system shown in FIG. 1, according to one embodiment.

FIG. 2 illustrates one embodiment of the transport network management system 110. In the embodiment shown in FIG. 2, the transport network management system 110 includes a demand estimation subsystem 210, a candidate hub identification subsystem 220, a hub optimization subsystem 230, and a route optimization subsystem 240. In other embodiments, the transport network management system 110 contains different and/or additional elements. In addition, the functions may be distributed among the elements in a different manner than described. For example, although the transport network management system 110 is depicted as connected to the network 170, in some embodiments it is used for initial planning of the transport network and need not be connected to the other depicted components.

The demand estimation subsystem 210 predicts demand for transport services in a geographic region. The predicted demand may be provided as input to the other subsystems to assist in the planning of the transport network. In one embodiment, the demand estimation subsystem 210 initially predicts demand based on usage data for one or more existing ground-based transportation services in the geographic region. The input may be a geographic region (e.g., a city) and time period, and the predicted demand may be a corresponding set of hypothetical transport requests, each including an origin, destination, and time. Where planning continues after the transport network becomes operational (e.g., where a first set of hubs are built and an expansion including adding additional hubs is planned), the model for predicting demand may be updated over time based on usage data that includes flights between hubs in the transport network, as such data becomes available. Various embodiments of the demand estimation subsystem are described in greater detail below, with reference to FIG. 3.

The candidate hub identification subsystem 220 identifies a set of candidate locations for hubs within the geographic region. In one embodiment, the candidate hub identification subsystem 220 provides an interface with which a user, such as a transport network designer, can manually select candidate locations for hubs (e.g., by providing an address, GPS co-ordinates, clicking on the location on a map, etc.). Alternatively or additionally, the candidate hub identification subsystem 220 may automatically identify candidate locations based on predicted demand (e.g., as produced by the demand estimation subsystem 210). Various embodiments of the candidate hub identification subsystem 220 are described in greater detail below, with reference to FIG. 4.

The hub optimization subsystem 230 takes the set of candidate locations for hubs and selects a subset of the locations at which hubs should actually be positioned based on the predicted demand. In one embodiment, the hub optimization subsystem 230 identifies an initial group of hub positions to make the transport network operational and one or more additional groups to be added later to improve the coverage of the network. The hub optimization subsystem 230 may also recommend a type for each hub (e.g., indicating a number of landing pads, a number of chargers, a number of VTOL aircraft storage bays, and the like). Various embodiments of the hub optimization subsystem 230 are described in greater detail below, with reference to FIG. 5.

The output from the hub optimizations subsystem 230 may be fed into the route optimization subsystem 240. The coverage provided by the hubs identified by the hub optimization subsystem 230 provides an upper bound for throughput of the transport network. In other words, it is the maximum throughput achievable by placing hubs at the selected location assuming all qualifying transport requests are served by VTOL aircraft 120. However, this upper bound may not be realized as it does not consider whether a VTOL aircraft 120 will be available to service any given transport request. The route optimization subsystem 240 models the flow of VTOL aircraft 120 and riders through the transport network to determine how to manage the fleet of VTOL aircraft to realize close to the maximum throughput. Various embodiments of the route optimization subsystem 240 are described in greater detail below, with reference to FIG. 6.

Figure 3:
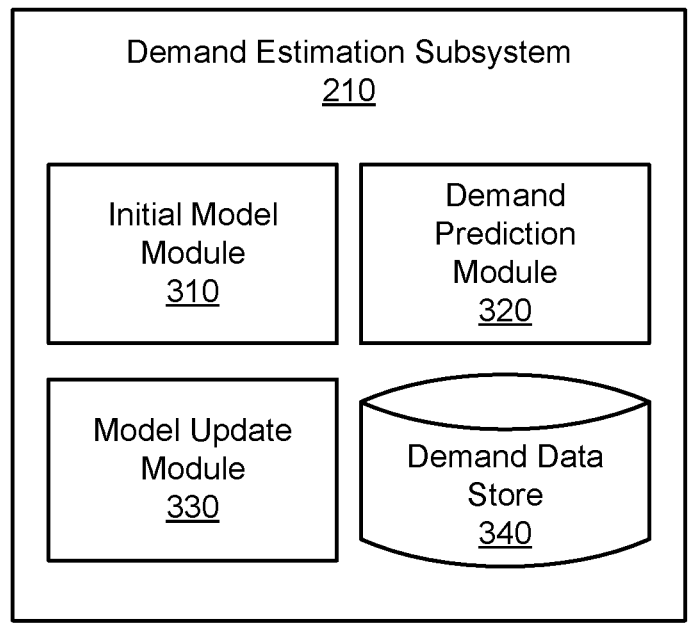
FIG. 3 is a high-level block diagram illustrating the demand estimation subsystem shown in FIG. 2, according to one embodiment.

FIG. 3 illustrates one embodiment of the demand estimation subsystem 210. The demand estimation subsystem 210 predicts demand for transport services within a geographic region. In the embodiment shown in FIG. 3, the demand estimation subsystem 210 includes an initial model module 310, a demand prediction module 320, a model update module 330, and a demand data store 340. In other embodiments, the demand estimation subsystem 210 contains different and/or additional elements. In addition, the functions may be distributed among the elements in a different manner than described. For example, in some embodiments, the demand estimation subsystem 210 is used during planning of the transport network to generate an initial demand model and the model update module 330 may be omitted.

The initial model module 310 generates a model to predict demand for VTOL services within a geographic region. The model may be built using historical travel data including requests for transport services over a long distance within the geographic region using ground-based transportation (e.g., via a ride sharing service) as a proxy for demand for VTOL demand. The historical travel data may be aggregated from multiple sources. In one embodiment, a request is considered long-distance where the Haversine distance between the origin and destination is between 20 and 100 miles. The initial model module 310 may consider any such requests as being within the geographic region if either the origin or destination is within a given distance (e.g., 120 miles) of a predetermined point (e.g., a center point of the geographic region). The predetermined point and given distance may be selected by the user. Alternatively, the user may define a geofence and only requests for which the origin or destination (or both) are within the geofence are considered. In other embodiments, other ways of determining which requests are considered to be within the geographic region and candidates for servicing with a VTOL aircraft 120 may be used.

In another embodiment, the initial model module 310 starts with a single estimate based on the historical travel data and uses a stochastic model (e.g., a two-phase stochastic model) to generate a more robust solution that accounts for multiple scenarios. A list of two or more scenarios are defined, each having a corresponding probability that it will occur. In the first phase, a set of hub locations are selected (e.g., as described below, with reference to FIGS. 4 and 5). The initial model module 310 then simulates servicing the predicted demand in view of the different scenarios and the corresponding probabilities. Thus, when the transport network is operational, the demand estimation subsystem 210 may analyze current demand data and compare it to the various scenarios to identify which is likely occurring. The demand estimation subsystem 210 may then generate new or updated predictions of future demand based on the identified scenario. The model can also be refined to be more amenable to bad realizations of outcomes. For example, one configuration choice for the transport network might result on average in servicing a greater number of transport requests by VTOL 120 across all scenarios, but in one low probability scenario, the number of requests serviced by VTOL is very low. It may be preferable to select a second configuration in which the average number of requests serviced by VTOL 120 across all scenarios is lower, but there is no scenario where the level of service drops significantly below the average.

The demand prediction module 320 applies the model to predict demand for VTOL services in the geographic region during some time period. In one embodiment, the user selects a start and end time for which a prediction is desired. Inputs to the model may include: current population of the geographic region, expected population growth of the geographic region, socioeconomics, locations of businesses and other entities (e.g., transport requests may be more often requested to and from airports, bars, venues, college campuses, etc.), and information about the cost, availability, and duration of other means of transport within the geographic region. If the transport network is already operational, the inputs may also include requests for transport services for the time period that have already been received and/or information about historical demand for transport services. The demand prediction module 320 may apply machine-learning techniques to learn how current inputs (e.g., time of day, day of the week, date, weather, special events, number and distribution of requests for transport services already received for the time period, planned outages or limitations for other modes of transport, and the like) may be mapped to future demand.

As described previously, the output from the model is a set of hypothetical transport requests that are candidates for being serviced at least in part with a VTOL aircraft 120, each including an origin, destination, and time. A request may be considered eligible for servicing by a VTOL aircraft 120 if it would reduce the total travel time by a threshold amount (e.g., 40%) over servicing the request entirely with ground-based transportation. In one embodiment, the demand estimation module 320 periodically (e.g., every minute, every five minutes, etc.) estimates demand for a future window of time (e.g., the next hour, the next four hours, the next day, etc.).

The model update module 330 updates the model used to predict demand as new data becomes available. In one embodiment, once the aviation transport network is operational, the model update module 330 combines the historical travel data derived from ground-based services with travel data derived from requests actually serviced by VTOL aircraft 120. The VTOL services data may be weighted more heavily than the historical data to reflect the fact that it relates to actual VTOL demand rather than a proxy. For example, the transport network management system 110 may see an increase in requests for transport services over long-distances as the lower travel times that result from VTOL aircraft availability increase the attractiveness of long-distance travel to riders.

The demand data store 340 is one or more computer-readable media configured to store demand data. Although it is depicted as a single entity within the demand estimation subsystem 210, it may be spread across multiple computing devices. For example, the demand data store 340 may be a distributed database that the demand estimation subsystem 210 accesses remotely via the network 170. In one embodiment, the demand data store 340 stores the historical demand data used to build the initial model as well as the data describing actual VTOL services that may be used to update the model. The demand data store 340 may also store the model itself. In some embodiments, the transport network management system 110 serves multiple geographic areas and the demand data store 340 stores different models for each geographic area. Multiple versions of each model may also be stored (e.g., to allow the demand estimation subsystem 210 to roll back to an earlier version if an updated model is found to be less accurate).

Figure 4:
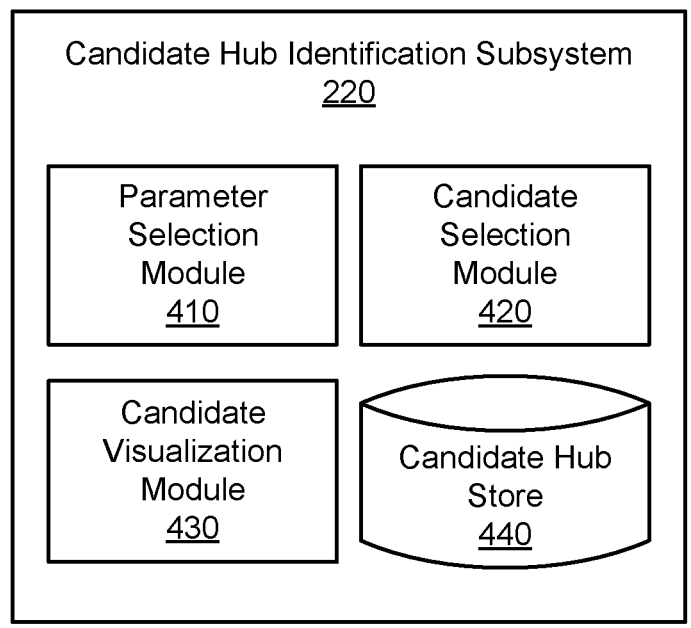
FIG. 4 is a high-level block diagram illustrating the candidate hub identification subsystem shown in FIG. 2, according to one embodiment.

FIG. 4 illustrates one embodiment of the candidate hub identification subsystem 220. The candidate hub identification subsystem 220 identifies candidate locations for hubs at which VTOL aircraft 120 may take off and land. In the embodiment shown in FIG. 4, the candidate hub identification subsystem 220 includes a parameter selection module 410, a candidate selection module 420, a candidate visualization module 430, and a candidate hub store 440. In other embodiments, candidate hub identification subsystem 220 contains different and/or additional elements. In addition, the functions may be distributed among the elements in a different manner than described. For example, some embodiments may omit the candidate visualization module 430 and corresponding functionality.

The parameter selection module 410 provides a user interface for selecting parameters to be used in identifying candidate locations for hubs. In one embodiment, the parameters include the total number of candidate locations to identify, locations that must be considered candidates (e.g., by providing GPS coordinates, etc.), locations that cannot be considered (e.g., by defining a geofence around an excluded area). Alternatively, one or more of the parameters may be predetermined. For example, the number of candidate hubs may be constrained to a fixed value (e.g., 100).

The candidate selection module 420 identifies a set of candidate locations for hubs based on estimated demand (e.g., as produced by the demand estimation subsystem 210) and the selected parameters. In one embodiment, the candidate selection module 420 applies a k-means clustering algorithm to the origins and destinations of the hypothetical transport requests generated by the demand estimation subsystem 210. In the algorithm, k may be set to the total number of candidate locations desired or the total number less the number of candidate locations the user has indicated must be included. The candidate selection module 420 identifies the centroid of each cluster as a candidate location for a hub. In other embodiments, other approaches may be used to identify candidate locations based on the estimated demand.

The candidate visualization module 430 (if included) presents the candidate locations to the user. In one embodiment, the candidate visualization module displays a map of the geographic region with the candidate locations overlaid (e.g., as black circles, etc.). The candidate visualization module 430 may allow the user to add additional locations that must be considered, remove candidate locations generated by the candidate selection module 420, and/or change the location of candidates. The visualization may also assist the user in modifying the parameters and rerunning the process of identifying candidate locations.

The candidate hub store 440 is one or more computer-readable media configured to store the candidate locations for hubs. It may also store a local copy of the data used by the candidate hub identification subsystem 220, such as estimated demand data. Although it is depicted as a single entity within the candidate hub identification subsystem 220, it may be spread across multiple computing devices.

Figure 5:
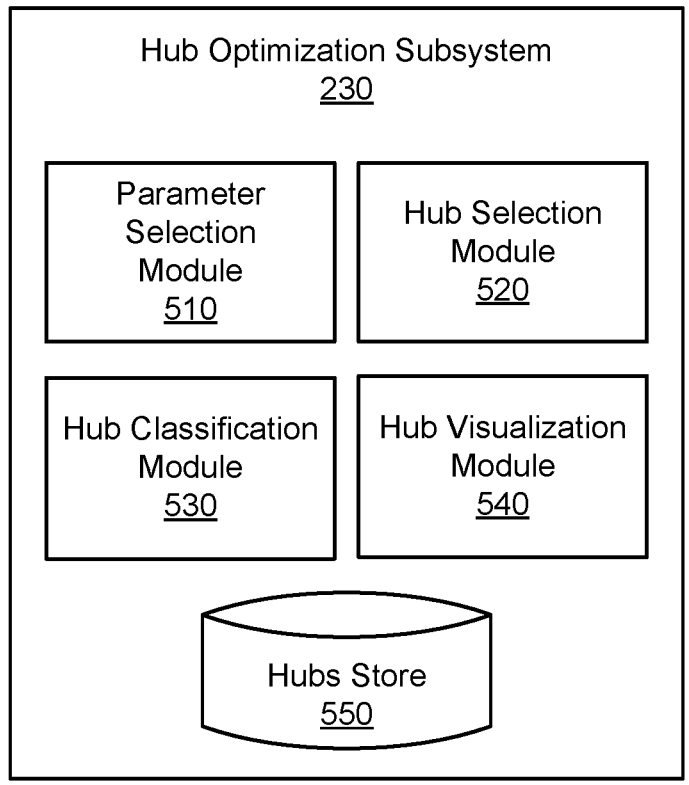
FIG. 5 is a high-level block diagram illustrating the hub optimization subsystem shown in FIG. 2, according to one embodiment.

FIG. 5 illustrates one embodiment of the hub optimization subsystem 230. The hub optimization subsystem 230 assists with selecting which candidate locations for hubs to select to build hubs. In the embodiment shown in FIG. 5, the hub optimization subsystem 230 includes a parameter selection module 510, a hub selection module 520, a hub classification module 530, a hub visualization module 540, and a hubs store 550. In other embodiments, the hub optimization subsystem 230 contains different and/or additional elements. In addition, the functions may be distributed among the elements in a different manner than described. For example, some embodiments may omit the hub visualization module 540 and corresponding functionality.

Similar to its counterpart in the candidate hub identification subsystem 220, the parameter selection module 510 provides a user interface for selecting parameters used in determining which candidate locations should be selected for building actual hubs. In one embodiment, the user may select between two objectives: maximizing the number of riders whose requests are covered by a hub or maximizing the total time saved using VTOL aircraft 120. The user may select a fixed number of hub locations (e.g., twenty-five) that should selected or the number may be left to be determined by the optimization objective. Similarly, the user may identify a number (or range) of hubs of different types that should be included (e.g., five large hubs with the capacity for sixteen VTOL aircraft 120, charging equipment, and maintenance services; ten medium hubs with the capacity for four VTOL aircraft, and charging equipment; and ten small hubs with the capacity for one VTOL aircraft). The parameter selection module 510 may also enable the user to identify multiple phases of construction, which may have different objectives. For example, a first phase might be restrained to twenty-five hubs with the goal of maximizing the number of riders served and a second phase might involve building another fifteen hubs with the goal of maximizing the amount of time saved. In other embodiments, different objectives or combinations of objectives may be set.

The parameter selection module 510 may also enable the user to set other parameters regarding the transport network. For example, in one embodiment the user can set a minimum distance (e.g., a Haversine distance) between hubs, a maximum distance VTOL aircraft 120 can travel without recharging, the rate at which a VTOL aircraft battery charges, whether the battery can be swapped (and how long it takes), a maximum airspeed of the VTOL aircraft, time taken to take off and land, time taken to load and unload riders, a threshold timesaving for a request to be considered eligible for service by VTOL, a number of riders a VTOL aircraft may carry at once, and curfew times (e.g., a period at night when VTOL aircraft are not allowed to fly), and the like. Some or all of these parameters may be preset and unavailable to be changed by the user. In some embodiments, the transport network may include more than one type of VTOL aircraft 120 and the user may provide the parameters for each type. Alternatively, the user may just select the type or types of VTOL aircraft 120 from a list (e.g., in a drop-down menu) and the parameter selection module 510 retrieves the corresponding information (maximum airspeed, maximum distance without recharging, number of riders that can be carried, etc.) from a data store.

The hub selection module 520 selects a subset of the candidate locations as recommended locations to construct hubs. In various embodiments, the hub selection module 520 retrieves predicted demand data (e.g., from the demand data store 340) that includes a set of hypothetical requests for transport services. Each hypothetical request includes an origin and a destination. The hub selection module 520 identifies a subset of the candidate hubs that meets all of the provided parameters and best meets the selected objective.

In one embodiment, for a given subset of candidate hubs, the hub selection module 520 determines how to service each request. A request will either be serviced by a single leg on the ground (e.g., using a ridesharing service) or a set of three legs where the middle leg is serviced by a VTOL aircraft 120. The first and third legs are ground-based, and can be walking legs or serviced by ground-based transportation. A given request may be a candidate for servicing by a VTOL aircraft 120 if the resulting time saving exceeds a threshold (e.g., 40%) over servicing the request entirely with ground-based transportation. The time taken for a VTOL-serviced leg may be estimated by multiplying the Haversine distance by a constant scaling factor (e.g., 1.42) to get a leg distance and assuming a typical airspeed (e.g., 170 miles per hour). When a request is serviced by VTOL aircraft 120, the first and third legs may be considered candidates for being walking legs if they are less than a threshold distance (e.g., if the Haversine distance is less than 500 meters).

The hub selection module 520 may treat selection of the subset of hubs as a binary optimization problem. For example, define H as the set of candidate hubs each of which are either selected or not and R as the set of riders, indexed by r, each having a set of paths P(r). A path is an itinerary that contains a VTOL-serviced leg. Based on this, one may define three further variables:
1) For each candidate hub, h∈H, $z_h$ indicates whether that hub is chosen ($z_h=1$) or not ($z_h=0$).
2) $x_{r,p}$ is a binary variable that equals 1 if rider r is assigned to path p from P(r) and 0 otherwise.
3) To account for the fact that not all requests may be covered depending upon the hubs chosen, $y_r$ is another binary variable that equals 1 when rider r is not assigned a VTOL path and 0 otherwise.

Assigning rider r to path p takes incurs some duration savings $\tau_{r,p}$. Formally this is the reduction in minutes relative to taking ground-based transportation and is measured as follows:

$$\tau_{r,p} = T(o(r),d(r)) - [T(o(r),h_{dep}(p)) + VTOL(h_{dep}(p),h_{arr}(p)) + T(h_{arr}(p),d(r)) + \alpha]$$

Where T(i,j) is the estimated driving time from location i to j, VTOL(i,j) is the estimated duration of taking a VTOL aircraft 120 from hub i to hub j, and α is a fixed number applied to all VTOL-serviced itineraries consisting of a load time, take off time, landing time, and unload time. Moreover o(r) and d(r) represent the origin and destination of rider r and $h_{dep}(p)$ and $h_{arr}(p)$ represent the departure and arrival hubs for path p. To encourage servicing of as many requests as possible by VTOL 120, a penalty λ may be applied for any request not covered by a VTOL route. This leads to the following formulation of the optimization problem:

$$\max \sum_{r \in R} \sum \left( \sum_{p \in P(r)} \tau_{r,p} x_{r,p} \right) - \lambda y_r \qquad (1)$$

-continued $$\text{s.t.} \sum_{p \in P(r)} x_{r,p} + y_r = 1 \forall r \in R \quad (2)$$

$$\sum_{h \in H} z_h = \min\{|H|, b\} \quad (3)$$

$$x_{r,p} \le \frac{1}{2} z_i + \frac{1}{2} z_j \forall r \in R, \forall (i, j) \in P(r) \quad (4)$$

$$z_i + z_j \le 1 \forall (i, j) \in C \quad (5)$$
$$x_{r,p} \in \{0, 1\} \forall r \in R, \forall p \in P(r)$$
$$y_r \in \{0, 1\} \forall r \in R$$
$$z_h \in \{0, 1\} \forall h \in H$$

Here, constraint (1) seeks to maximize total duration savings for all riders in the network jointly by favoring assigning riders to itineraries with large time savings (first term) and by penalizing requests not serviced by VTOL aircraft 120 (second term). Constraint (2) ensures all riders are assigned either to a VTOL itinerary or are to remain on the ground. Constraint (3) ensures the number of hubs selected do not exceed the maximum allowable. Constraint (4) ensures riders are assigned only to itineraries for which both departure and arrival hubs are included in the selected subset. Notice that if either origin (i) or destination (j) hub are closed for path p this forces $x_{r,p}$ to be 0. Constraint (5) ensures that for any hubs that are too close together in a set, $e$, at most one of these hubs is chosen. This set of constraints may be solved by an integer program optimization solver to identify a subset of the candidate hubs that meets the applied constraints and achieves the selected objective. Note that the balance between total time savings and VTOL aircraft 120 utilization may be altered by modifying the magnitude of the penalty applied for requests not serviced by a VTOL aircraft (e.g., by changing the value of λ). In other embodiments, other optimization processes may be used.

The hub classification module 530 assigns recommended types to the hubs in the subset identified by the hub selection module 520. The hub classification module 530 may define the expected throughout of each selected hub based on the itineraries that include the hub as either an origin or destination of a VTOL-serviced leg. The throughput may be an average number of requests serviced per hour, per day, etc. Alternatively, the throughput may be an expected maximum number of requests serviced in a given time period (e.g., the number of expected requests in the busiest hour of the day for that hub, which may be different for different hubs).

In one embodiment, the hub classification module 530 assigns a recommended type to each hub based on the expected throughputs. The types may be selected from a set of pre-determined designs to provide uniformity and reduce design and construction costs. For example, there may be small, medium, and large hub designs, with the capacities to handle take off/landing of one, four, and sixteen VTOL aircraft 120 simultaneously (or approximately simultaneously), respectively. Alternatively, the hub classification module 530 may assign a number of VTOL aircraft 120 that each hub should be able to take off/land simultaneously (or approximately simultaneously) at the hub. In either case, the classification may take into account a prediction of future growth in demand.

The hub classification module 530 may also indicate how many VTOL charging stations should be available at each hub (including zero). In one embodiment, the charging facilities available are tied to the type of the hub. E.g., a large hub may have four charging stations, a medium hub one, and a small hub zero. Alternatively or additionally, the hub classification module 530 may consider the distance between the hub and other hubs where charging stations are available. For example, a small hub located at the edge of the transport network, a large distance away from other hubs, may include a charging station even though most small hubs do not. In another embodiment, the number or proportion of each type of hub is set by a user (e.g., via the parameter selection module 510) and the hub classification module 530 selects which hubs should be of which type accordingly. For example, if the user indicates that there should be five large hubs, the parameter selection module 510 might select the five hubs in the subset that have the largest throughput as the large hubs, etc.

The hub visualization module 540 (if included) presents the selected hub locations to the user. In one embodiment, the hub visualization module 540 overlays indicators of the selected hub locations on a map of the geographic region. The type of each hub may be indicated by variations in size, color, shape, or the like of the indicators. For example, each hub location may be indicated by a black circle with the size of the circle corresponding to the type of hub (e.g., a larger circle is a larger hub). Alternatively, the type of hub and/or additional information (e.g., expected throughout) may be provided next to the indicator or in response to the user selecting the indicator (e.g., by clicking on it). Similarly, where the hubs are to be built in multiple phases, a property of the indicators may indicate which phase of construction each hub is in (e.g., the first phase hubs might be red while second phase hubs might be blue, etc.). The hub visualization module 540 may also provide a user interface for altering the selected hub locations. For example, in one embodiment, the user can add, remove, or relocate hubs as well as change the type and construction phase of each hub.

The hubs store 550 is one or more computer-readable media configured to store the locations for hubs and corresponding data (e.g., types, throughput, etc.). It may also store a local copy of the candidate hub locations and/or estimated demand data for more efficient data processing. Although it is depicted as a single entity within the hub optimization subsystem 230, it may be spread across multiple computing devices.

Figure 6:
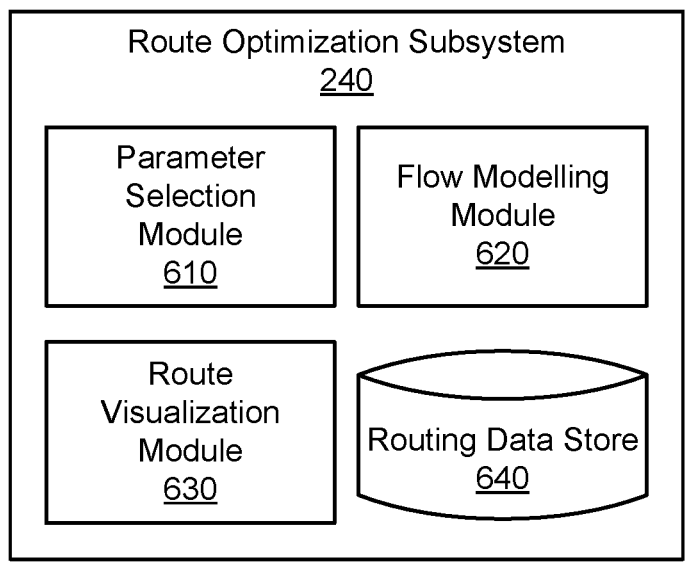
FIG. 6 is a high-level block diagram illustrating the route optimization subsystem shown in FIG. 2, according to one embodiment.

FIG. 6 illustrates one embodiment of the route optimization subsystem 240. The route optimization subsystem determines the routing of VTOL aircraft 120 and riders through the transport network. In the embodiment shown in FIG. 6, the route optimization subsystem 240 includes a parameter selection module 610, a flow modelling module 620, a route visualization module 630, and a routing data store 640. In other embodiments, the route optimization subsystem 240 contains different and/or additional elements. In addition, the functions may be distributed among the elements in a different manner than described.

The parameter selection module 610 (like its counterparts in the candidate hub identification subsystem 220 and hub optimization subsystem 230) provides a user interface for defining various parameters to be used in modelling the transport network. In one embodiment, the definable parameters include VTOL parameters and objectives. The VTOL parameters may include the number of available VTOL aircraft 120 and, where multiple types are available, their type or types. For each VTOL type, the VTOL parameters may include en route speed, time to ascend, number of seats, whether the VTOL aircraft is autonomous, maximum flying range, battery consumption rate when cruising, battery consumption for take-off and landing, battery re-charging rate, whether the battery may be switched at a hub and how long switching takes, and the like. In situations where the routing is being performed for an operational transport network (e.g., in real time or substantially in real time), the parameter selection module 610 may determine some or all of the parameters from data available from the VTOLs 120 and/or hub management systems 130.

The objective may be to: (1) maximize the number of people transported; (2) maximize use of VTOL aircraft 120 (e.g., use as few VTOL aircraft as possible while minimizing time each spends on the ground); or (3) minimize the total costs of operations, including passenger movement costs (e.g., a per-minute penalty for itineraries longer than the minimum possible), VTOL usage costs (e.g., a penalty for under-utilized VTOL legs), and VTOL aircraft repositioning costs (either to other hubs or within a hub, such as from a landing pad to a storage area). Other objectives and VTOL parameters may also be used.

The flow modelling module 620 models the flow of VTOL aircraft 120 and riders through the transport network, trying to maximize efficiency in view if the selected objective. In various embodiments, the flow modelling module 620 discretizes time into segments (e.g., one minute, five minutes, etc.) and calculates an optimum or substantially optimum routing for the fleet of VTOLs 120 for each segment. The flow modelling module 620 solves the resulting multi-commodity network flow problem (riders and VTOL aircraft 120 are both commodities in the model) to determine how each VTOL aircraft should be routed to meet the selected objective.

In one embodiment, the network flow model is defined as follows:

M: The set of VTOL aircraft.
N: The set of all nodes.
P: The set of passengers.
H: The set of hubs.
$S_{it}^n$: The supply (+) or demand (−) or transit (0) of number of passengers o group n at hub i at time t.
$V_{it}$: The supply (+) or demand (−) or transit (0) of number of VTOL aircraft at hub i at time t.
(it,jt̄): Arc that travels from hub i at time t and arrives at hub j at time t̄.
In(it): The set of arcs coming into hub i at time t.
Out(it): The set of arcs going out from hub i at time t.
A: The set of all arcs (flight arcs and ground arcs).
TA: The set of VTOL transit arcs.
$G_i$: The set of ground arcs for the $i^{th}$ hub.
U: The set of arcs for requests served by ground-based transport.
T: The set of all time periods.
$x_i^m$: Whether VTOL aircraft m travels arc i.
$y_i^p$: The number of passengers in group p that travels arc i.
$z_t^m$: The battery level of VTOL aircraft m at time t.
$E_i$: The battery consumption (if flying) or charging (if on the ground) for a VTOL aircraft to travel arc i.
VC: The passenger capacity of a VTOL aircraft.
$HC_i$: The capacity of the $i^{th}$ hub.
B: The max battery level of a VTOL aircraft.
$R_i$: The cost of repositioning a VTOL aircraft by arc i.
$C_i$: The cost of travelling arc i.

Using the above definitions, the model may be defined by the following constraints:

$$\max \sum_{p \in P} \sum_{i \in FA} y_i^p \quad (1)$$

$$\text{s.t.} - \sum_{j \in In(it)} y_j^p + \sum_{k \in Out(it)} y_k^p = S_{it}^p \quad \forall i \in N, \forall t \in T, \forall p \in P \quad (2)$$

$$V_{i1} - \sum_{m \in M} \sum_{a \in Out(it)} x_a^m = 0 \quad \forall i \in H \quad (3)$$

$$\sum_{a \in Out(it)} x_a^m - \sum_{b \in In(it)} x_b^m = 0 \quad \forall i \in H, t \in T, \forall m \in M \quad (4)$$

$$\hat{V}_{iT} + \sum_{m \in M} \sum_{b \in In(it)} x_b^m = 0 \quad \forall i \in H \quad (5)$$

$$\sum_{m \in M} x_i^m \leq HC_j \quad \forall i \in G_j, \forall j \in H \quad (6)$$

$$\sum_{p \in P} y_j^p \leq \sum_{m \in M} x_j^m \quad \forall j \in A \quad (7)$$

$$x_a^m \in \{0, 1\} \quad \forall a \in A \quad (8)$$

$$y_a^p \in \{0, 1\} \quad \forall a \in A \quad (9)$$

The network flow module 620 may solve the model to meet a specified objective, such as:

1. Max time savings $$\max \sum_{p \in P} \left( T^p - \sum_{i \in A} T_i y_i^p \right) \quad (10)$$

2. Max VTOL utilization $$\max \sum_{m \in M} x^m \quad (11)$$

$$x^m \leq \sum_{a \in FA} x_a^m, \forall m \in M \quad (12)$$

3. Minimize total cost (traveling cost, repositioning cost)

$$\min \sum_{p \in P} \sum_{i \in TA} R_i (x_i^p - y_i^p) + \sum_{p \in P} \sum_{i \in A} C_i y_i^p + \sum_{m \in M} q^m \quad (13)$$

$$x_a^m \leq q^m \quad \forall a \in TA, \forall m \in M \quad (14)$$

The model used by the network flow module 620 may also be defined as a path-based model:

$$\min \sum_{r \in R} u^r \quad (15)$$

$$\text{s.t.} \sum_{p \in P(r)} y_p^r + u^r = 1 \quad \forall r \in R \quad (16)$$

$$\sum_{r \in R} \sum_{p \in P(r)} \delta_{ij}^p y_p^r \leq \sum_{v \in V} C^v \sum_{p \in P(v)} \delta_{ij}^p x_p^v \quad \forall ij \in A \quad (17)$$

$$\sum_{p \in P(v)} x_p^v = 1 \quad \forall v \in V \quad (18)$$

$$\sum_{v \in V} \sum_{p \in P(v)} \delta_{ij}^p x_p^v \leq HC_{ij} \quad \forall ij \in G \quad (19)$$

-continued $$x_p^v \in \{0, 1\} \quad \forall \, p \in P(v) \quad (20)$$

$$y_p^r \in \{0, 1\} \quad \forall \, a \in A \quad (21)$$

$$u^r \in \{0, 1\} \quad \forall \, r \in R \quad (22)$$

which results in a reduced cost per column of $$-\sum_{ij \in A} \alpha_{ij} C^v \delta_{ij}^p - \sum_{ij \in G} \gamma_{ij} C^v \delta_{ij}^p - \beta_v \quad (23)$$

Thus, the network flow module 620 can determines how to route VTOL aircraft 120 through the transport network by finding the shortest path using negative weights and fuel constraints. In this embodiment, the ground arcs have weights of $-\alpha_{ij} C^v - \gamma_{ij}$ and other arcs will have the weights $-\alpha_{ij} C^v$. In one embodiment, the network flow module 620 considers servicing each transport request via VTOL and each of multiple modes of ground transportation. The network flow module 620 may determine which mode of transport (including VTOL) is likely to be used to service each request. The network flow module 620 may calculate a probability of each request being serviced by each mode of transport based on factors such as: the origin, the destination, the time, convenience (e.g., ingress and egress times), demographics, and the like. In other embodiments, different models for optimizing the routing may be used.

The route visualization module 630 presents the results of modelling the flow of VTOL aircraft 120 and riders within the transport network to the user. In one embodiment, the results are presented as a set of summary statistics including the number of VTOL aircraft 120 in the fleet, a VTOL utilization percentage (e.g., the percentage of available seats on VTOL legs that were filled), an average time saved for requests serviced by VTOL aircraft (e.g., as a percentage of the ground-only equivalent time), the total number of riders served by VTOL aircraft in the period modelled. In other embodiments, the summary statistics may include different or additional information.

In addition, the route visualization module 630 may present a timeline indicating how demand varied by hub and over time. In one embodiment, if the user selects a particular time (e.g., by clicking on the corresponding point on the timeline), the route visualization module 630 presents a visualization of state of the transport network at that time, such as by overlaying the flight path of each VTOL aircraft 120 in the air at that point over a map of the geographic area Furthermore, if the user selects a hub, the route visualization module 630 may provide information about the selected hub, such as a number of incoming and outgoing VTOL aircraft 120, a number of passengers waiting to board a VTOL aircraft at the hub, a number of unoccupied landing pads at the hub, and the like. Similarly, if the user selects a VTOL flightpath, information about the corresponding VTOL aircraft 120 and the flightpath may be shown (e.g., an identifier of the particular VTOL aircraft, identifiers of the riders currently being serviced, origin and destination hubs, battery charge remaining, and time remaining to arrival).

The visualizations provided by the route visualization module 630 may help the user gain a deeper understanding of the transport network and identify potential problems and improvements before construction of the actual infrastructure begins. For example, the user may be able to identify potential choke points in the transport network, either in the form of overburdened hubs or time periods where demand is likely to exceed the number of available VTOL aircraft 120. The visualizations may also help the user understand how much time will be saved for riders and how many riders will be served, which in turn may be used to estimate how traffic congestion may be alleviated.

The routing data store 640 stores data used and/or generated by the route optimization subsystem. In one embodiment, the routing data store 640 stores the results of each simulation performed by the flow modelling module 620. Thus, a user may perform multiple simulations using different parameters and then compare the results at a later time. The routing data store 640 may additionally or alternatively store local copies of the data used to model the transport network, such as the hub locations generated by the hub optimization subsystem 230 and the demand data generated by the demand estimation subsystem 210.

Computing System Architecture

Figure 7:
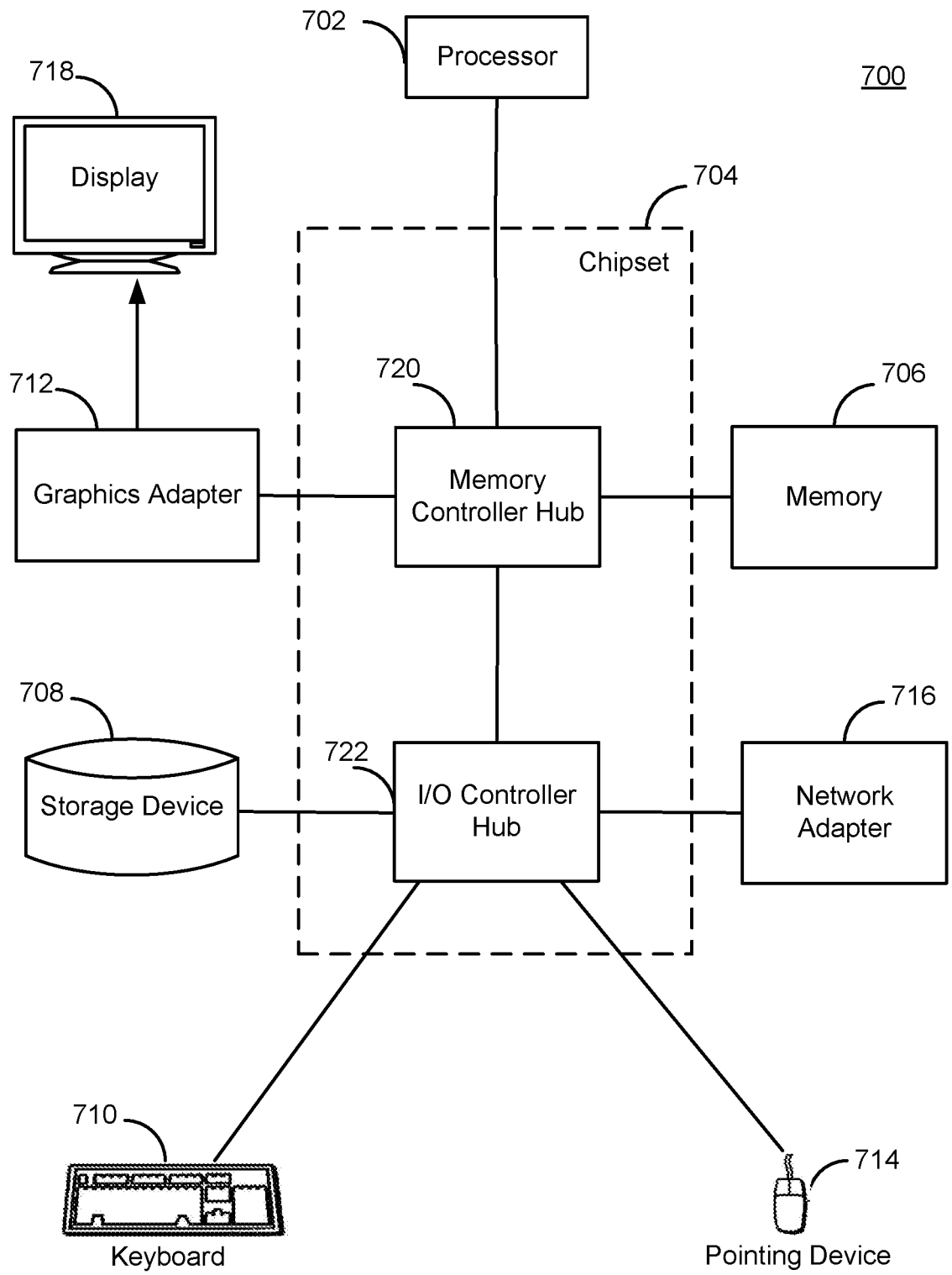
FIG. 7 is a high-level block diagram illustrating an example of a computer suitable for use in the computing environment of FIG. 1, according to one embodiment.

FIG. 7 is a high-level block diagram illustrating an example computer 700 suitable for use within the computing environment 100. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer system 700. The graphics adapter 712 displays images and other information on the display 718. The network adapter 716 couples the computer system 700 to one or more computer networks.

The types of computers used by the entities of FIGS. 1 through 6 can vary depending upon the embodiment and the processing power required by the entity. For example, the transport services management system 110 might include multiple computers 700 working together to provide the functionality described. Furthermore, the computers 700 can lack some of the components described above, such as keyboards 710, graphics adapters 712, and displays 718.

Example Methods

Figure 8:
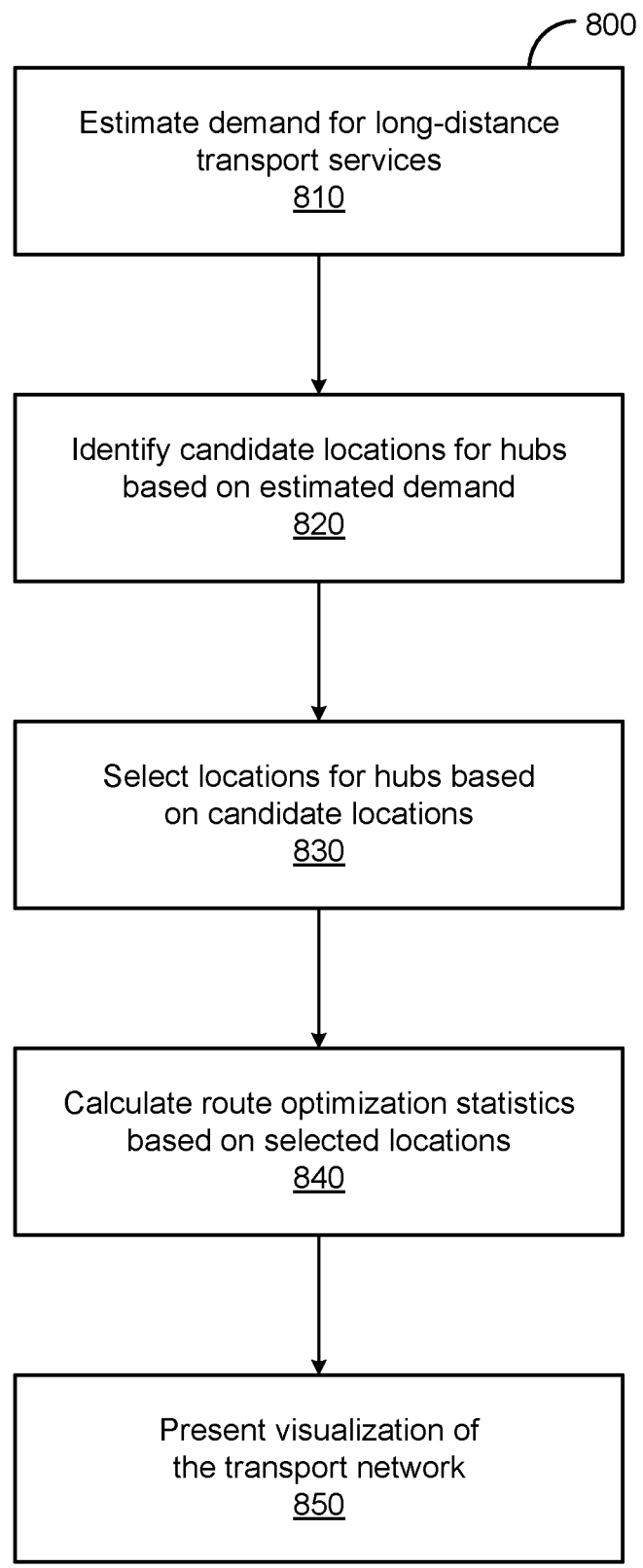
FIG. 8 is a flow-chart illustrating a method for planning and managing a transport network, according to one embodiment.

FIG. 8 illustrates one embodiment of a method 800 for planning an aviation transport network. The steps of FIG. 8 are illustrated from the perspective of the transport network management system 110 performing the method 800. However, some or all of the steps may be performed by other entities or components. In addition, some embodiments may perform the steps in parallel, perform the steps in different orders, or perform different steps.

In the embodiment shown in FIG. 8, the method 800 begins with the transport network management system 110 estimating 810 demand for long-distance (e.g., 20 to 120 miles) transport services. The estimated demand is a set of hypothetical transport requests, each including an origin, a destination, and a request time. As described previously, the hypothetical transport requests may be based on historical requests for long-distance transport services using ground-based transportation. In one embodiment, the historical requests are used as the hypothetical requests. In another embodiment, a set of hypothetical transport requests is generated with a similar distribution as the historical requests, with adjustments applied for factors such as expected population growth, expected increase in demand once VTOL aircraft 120 become available, and the like.

The transport network management system 110 identifies 820 the candidate locations for hubs based on the estimated demand. As described previously, the transport network management system 110 may cluster the origins and destinations of transport requests (e.g., using k-mean clustering) and identify 820 the centroid of each cluster as a candidate location. In one embodiment, the transport network management system 110 identifies 820 one hundred candidate locations for hubs. In another embodiment, the number of hubs to identify is configurable by the user. The user may also be able to manually select or adjust one or more of the candidate locations.

The transport network management system 110 selects 830 a subset of the candidate locations as the locations for hubs. As described previously, the transport network management system 110 may select 830 the locations of the hubs to achieve one or more objectives, such as maximizing VTOL coverage, maximizing the reduction in travel time across the network, or minimizing a pre-defined cost function (e.g., to balance VTOL coverage with reductions in travel time). In one embodiment, the selected 830 locations are divided into different phases to be constructed at different times and which may serve different goals. For example, an initial twenty-five hubs might aim to maximize VTOL coverage while the next ten might aim to maximize savings in travel time. The number of hubs and phases may be predetermined or configurable by the user. The hubs may also be of one or more types (e.g., large, medium, and small), each with a different number of landing pads, charging stations, etc.). In some embodiments, the user may also manually set or adjust the location and/or type selected for one or more hubs.

The transport network management system 110 calculates 840 route optimization statistics based on the selected information. In one embodiment, the user defines additional parameters, such as the number of VTOL aircraft 120 and information about the VTOL aircraft (e.g., number of seats, cruising speed, time required for take-off and landing, battery capacity, etc.). The transport network planning management 110 determines the optimal routing for the VTOL aircraft 120 to meet the hypothetical demand and calculates 840 corresponding routing information. The route optimization statistics may include a percentage of the requests served by a VTOL aircraft 120, the total time saved relative to using ground-based transportation alone, a total number of people served, an average number of empty seats on VTOL aircraft when flying, and the like. In other embodiments, different or additional information may be included in the route optimization statistics.

The transport network management system 110 presents 850 a visualization of the transport network to a user. In one embodiment, the visualization includes a map of the geographic area served by the transport network with the hubs overlaid as geometric shapes (e.g., circles) at the corresponding locations. The visualization may also include the route optimization statistics (e.g., in a table). Additionally or alternatively, the visualization may include a time line indicating how demand varies over time, overlay some or all of the VTOL flight paths on the map, provide access to additional information about hubs and VTOL aircraft 120 (e.g., in response to clicking on the corresponding graphical representation in the visualization), and the like, as described previously.

Figure 9:
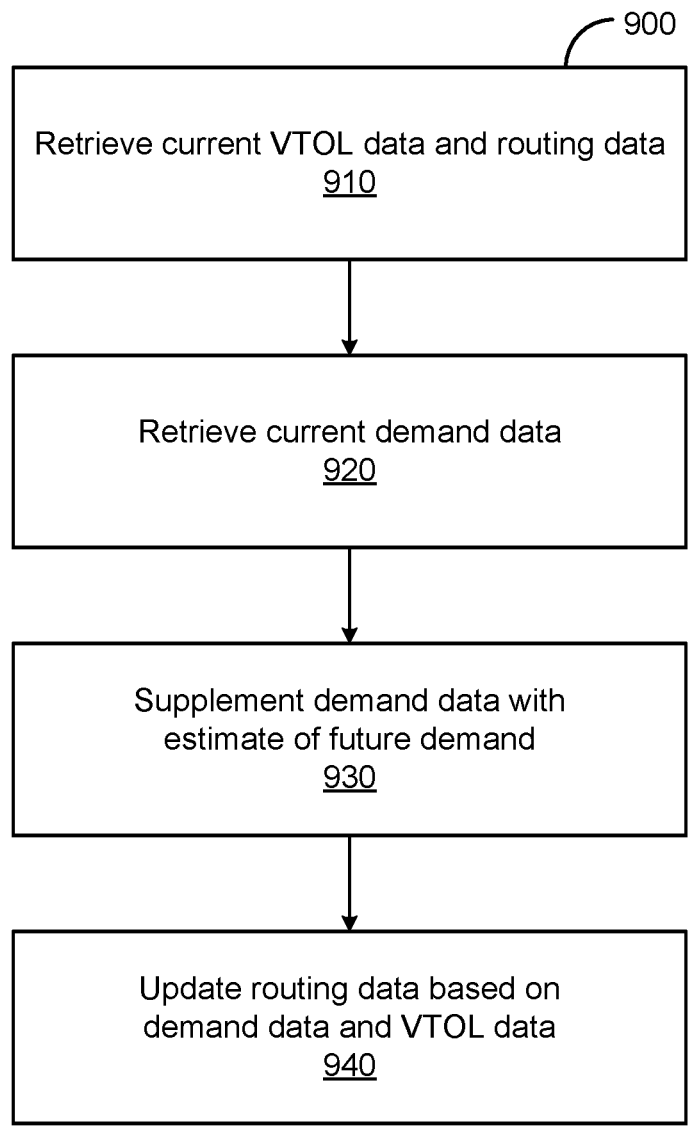
FIG. 9 is a flow-chart illustrating a method for determining routing within a transport network, according to one embodiment.

FIG. 9 illustrates one embodiment of a method 900 for determining routing for a fleet of VTOLs 120 within a transport network. The steps of FIG. 9 are illustrated from the perspective of the transport network management system 110 performing the method 900. However, some or all of the steps may be performed by other entities or components. In addition, some embodiments may perform the steps in parallel, perform the steps in different orders, or perform different steps.

FIG. 9 illustrates a single iteration of the method 900. In one embodiment of an active transport network, the method 900 is repeated periodically (e.g., every minute, every five minutes, etc.) to update the routing data for the fleet of VTOLs 120 based on the current conditions. This may enable efficient use of the fleet, even in scenarios where there is a sudden change in conditions. For example, an unexpected failure in another mode of transport (e.g., a subway system shutting down due to an accident) may result in a sudden surge in requests for transport services that may be serviced by VTOL 120, altering the optimal routing for the fleet. Thus, iterating the method 900 may provide advantages including increasing the amount of time saved by riders, reduce the total amount of power used, reduce wear and tear on the VTOLs 120, and the like.

In the embodiment shown in FIG. 9, the method 900 begins with the parameter selection module 610 retrieving 910 current VTOL and routing data. The VTOL data is information about each of the VTOLs 120 and may include: a current location, whether the VTOL is on the ground or in the air, a current battery level, a maximum battery level, and the like. The VTOL data may be received from the VTOLs 120 (e.g., via a wireless connection) or estimated based on last know values (e.g., as reported by a hub management system 130 when the VTOL 120 was last connected to charge) and the routing data (e.g., a VTOL 120 that is in the air may be assumed to travel along an instructed route at a typical air speed to estimate its current location). The routing data is information about the routes assigned to each VTOL 120. A route may include information such as: a destination, way points to visit en route, a time to depart, a speed to fly at, an amount of time to spend charging before departure or after arrival, a number (and the identity) of riders to carry, and the like. The routing data may be retrieved 910 from a data store (e.g., the routing data store 640).

The parameter selection module 610 also retrieves 920 current demand data. The current demand data includes requests for transport services that have already been sent by users. In one embodiment, the current demand data is set a set of transport requests received from users (e.g., submitted from client devices 140), each including an origin, a destination, and a time of request.

The parameter selection module 610 supplements 930 the current demand data with an estimate of future demand. The estimate of future demand may be generated using the demand estimation subsystem as described above, with reference to FIG. 3. The current demand data may be used as an input to the model used by the demand estimation subsystem 210. For example, if the current demand is higher than usual for a given day and time, this may indicate that demand may continue to be higher than normal. In one embodiment, the estimate of future demand is a set of hypothetical requests for transport services, each including an origin, a destination, and a time of request within a given time period (e.g., the next fifteen minutes, the next hour, the next four hours etc.). The estimate of future demand may be combined with the current demand data to generate a single set of transport requests (both actual and hypothetical/ expected). Thus, the demand data may represent an estimate of demand for the time period that includes both transport requests that have already been received and a prediction of future transport requests.

The route optimization subsystem 240 updates 940 the routing data based on the demand data. In one embodiment, the flow modelling module 620 determines the optimum routing based on the demand data as well as the VTOL and routing data. This may be done using the optimization approaches described above, with reference to FIG. 6. The input to the route optimization subsystem 240 may include the retrieved 910 VTOL data, the demand data, weather data, and the like. Based on the updated routing data, the route optimization subsystem 240 may send routing instructions to some or all of the VTOLs 120. For example, the instructions might direct a VTOL 120 to fly to a particular hub, charge its battery for a specified time, pick up specified riders, and perform other suitable activities to optimize the use of the VTOLs in the transport network.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for planning a transport network and coordinating transport services within that network. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A computer-implemented method for intra-city VTOL aircraft routing within a geographic area comprising:
   accessing data indicative of user ground-based travel within one or more geographic regions;
   accessing data indicative of one or more parameters associated with a transport network configured to provide services using vertical take-off and landing (VTOL) aircraft, the VTOL aircraft comprising a propulsion mechanism for horizontal and vertical thrust;
   performing a simulation of the transport network based on the data indicative of user ground-based travel and the one or more parameters associated with the transport network, wherein performing the simulation comprises:
      initializing an aerial transportation model based on the data indicative of user ground-based travel and the one or more parameters associated with the transport network, wherein the aerial transportation model comprises a plurality of nodes and a plurality of arcs between the plurality of nodes, at least a portion of the plurality of nodes representing candidate hubs of the transport network for vertical take-off and landing, and at least a portion of the plurality of arcs representing candidate routes for the VTOL aircraft,
      computing a flow of riders and the VTOL aircraft through at least the portion of the plurality of nodes representing the candidate hubs and at least the portion of the plurality of arcs representing the candidate routes; and
   providing an output based on the simulation, wherein the output indicates:
      hub locations for a plurality of hubs where the VTOL aircraft can take off and land via one or more landing or launching pads physically positioned on infrastructure within the geographic area to allow the VTOL aircraft to vertically take off and land for air travel within the geographic area; and
      one or more routes between at least a portion of the hub locations.

2. The computer-implemented method of claim 1, wherein computing the flow of riders and the VTOL aircraft comprises modeling the flow of riders and the VTOL aircraft through at least the portion of the plurality of nodes and at least the portion of the plurality of arcs using the aerial transportation model, and wherein performing the simulation comprises:
  selecting at least a portion of the candidate hubs for the output based on the modeling.

3. The computer-implemented method of claim 1, wherein the output comprises a map interface for display, wherein the map interface comprises a map with the hub locations and the one or more routes overlaid on the map.

4. The computer-implemented method of claim 1, wherein the one or more parameters associated with the transport network comprise at least one of: (i) one or more parameters associated with the VTOL aircraft; or (ii) one or more parameters associated with one or more of the plurality of hubs.

5. The computer-implemented method of claim 4, wherein the one or more parameters associated with the plurality of VTOL aircraft comprise at least one of: (i) a rider capacity; (ii) an airspeed; (iii) a charging rate; (iv) a travel distance without recharging, (v) whether a battery can be swapped; (vi) a time needed for take-off or landing; or (vii) a type of VTOL aircraft.

6. The computer-implemented method of claim 4, wherein the one or more parameters associated with one or more of the plurality of hubs comprise at least one of: (1) a distance between hubs; (ii) time to load or unload riders; or (iii) time restrictions on VTOL aircraft transportation.

7. The computer-implemented method of claim 1, wherein the one or more parameters associated with the transport network comprise initial candidate locations for the candidate hubs.

8. The computer-implemented method of claim 7, wherein at least one of the initial candidate locations for the plurality of hubs is identified via user input.

9. The computer-implemented method of claim 7, wherein at least one of the initial candidate locations for the plurality of hubs is automatically identified.

10. The computer-implemented method of claim 7, wherein performing the simulation of the transport network comprises:
  determining an estimated demand for transport services based on the data indicative of user ground-based travel; and
  computing the flow of the riders and the VTOL aircraft through at least the portion of the plurality of hubs of the transport network based on the initial candidate locations and the estimated demand for transport services.

11. The computer-implemented method of claim 10, wherein the estimated demand comprises: (i) an initial demand that is based on the data indicative of user ground-based travel, the data indicative of user ground-based travel comprising historical data, and (ii) a future demand that is based on transport requests for a configuration of the transport network.

12. The computer-implemented method of claim 1, wherein the output further comprises a recommendation associated with at least one of: (i) hub infrastructure; (ii) hub design; (iii) hub charging stations; (iv) a distance between hubs; or (v) VTOL aircraft storage at a hub.

13. One or more non-transitory computer-readable storage media comprising executable computer program code, the computer program code when executed causing one or more processors to perform operations for intra-city VTOL aircraft routing within a geographic area comprising:
  accessing data indicative of user ground-based travel within one or more geographic regions;
  accessing data indicative of one or more parameters associated with a transport network configured to provide services using vertical take-off and landing (VTOL) aircraft, the VTOL aircraft comprising a propulsion mechanism for horizontal and vertical thrust;
  performing a simulation of the transport network based on the data indicative of user ground-based travel and the one or more parameters associated with the transport network, wherein performing the simulation comprises:
    initializing an aerial transportation model based on the data indicative of user ground-based travel and the one or more parameters associated with the transport network, wherein the aerial transportation model comprises a plurality of nodes and a plurality of arcs between the plurality of nodes, at least a portion of the plurality of nodes representing candidate hubs of the transport network for vertical take-off and landing, and at least a portion of the plurality of arcs representing candidate routes for the VTOL aircraft,
    computing a flow of riders and the VTOL aircraft through at least the portion of the plurality of nodes representing the candidate hubs and at least the portion of the plurality of arcs representing the candidate routes; and
  providing an output based on the simulation, wherein the output indicates:
    hub locations for a plurality of hubs where the VTOL aircraft can take off and land via one or more landing or launching pads physically positioned on infrastructure within the geographic area to allow the VTOL aircraft to vertically take off and land for air travel within the geographic area; and
    one or more routes between at least a portion of the hub locations.

14. The one or more non-transitory computer-readable storage media of claim 13, wherein computing the flow of riders and the VTOL aircraft comprises modeling the flow of riders and the VTOL aircraft through at least the portion of the plurality of nodes and at least the portion of the plurality of arcs using the aerial transportation model, and wherein the operations further comprise:
  selecting at least a portion of the candidate hubs for the output based on the modeling.

15. The one or more non-transitory computer-readable storage media of claim 13, wherein the output comprises a map interface for display, wherein the map interface comprises a map with the hub locations and the one or more routes overlaid on the map.

16. The one or more non-transitory computer-readable storage media of claim 13, wherein the one or more parameters associated with the transport network comprise at least one of: (i) one or more parameters associated with the VTOL aircraft; or (ii) one or more parameters associated with one or more of the plurality of hubs.

17. The one or more non-transitory computer-readable storage media of claim 13, wherein the simulation is based on an optimization system and machine-learning techniques.

18. The one or more non-transitory computer-readable storage media of claim 13, wherein the simulation is based on an objective, the objective comprising at least one of: (i) maximizing a number of the riders transported; (2) maximizing a use of the VTOL aircraft; or (3) minimizing a cost of operations.

19. The one or more non-transitory computer-readable storage media of claim 13, wherein the simulation models the flow of the riders based on ground-based transport and aviation transport.

20. A computer system intra-city VTOL aircraft routing within a geographic area comprising:
  one or more processors; and
  one or more non-transitory computer-readable storage media comprising executable computer program code, the computer program code when executed causing the one or more processors to perform operations including:
    accessing data indicative of user ground-based travel within one or more geographic regions;
    accessing data indicative of one or more parameters associated with a transport network configured to provide services using vertical take-off and landing (VTOL) aircraft, the VTOL aircraft comprising a propulsion mechanism for horizontal and vertical thrust;
    performing a simulation of the transport network based on the data indicative of user ground-based travel and the one or more parameters associated with the transport network, wherein performing the simulation comprises:
      initializing an aerial transportation model based on the data indicative of user ground-based travel and the one or more parameters associated with the transport network, wherein the aerial transportation model comprises a plurality of nodes and a plurality of arcs between the plurality of nodes, at least a portion of the plurality of nodes representing candidate hubs of the transport network for vertical take-off and landing, and at least a portion of the plurality of arcs representing candidate routes for the VTOL aircraft,
    computing a flow of riders and the VTOL aircraft through at least the portion of the plurality of nodes representing the candidate hubs and at least the portion of the plurality of arcs representing the candidate routes; and
    providing an output based on the simulation, wherein the output indicates:
      hub locations for a plurality of hubs where the VTOL aircraft can take off and land via one or more landing or launching pads physically positioned on infrastructure within the geographic area to allow the VTOL aircraft to vertically take off and land for air travel within the geographic area; and
      one or more routes between at least a portion of the hub locations.

* * * * *